United States Patent Office 3,764,362
Patented Oct. 9, 1973

3,764,362
TREATMENT OF PIGMENTS
John James Hinley, Middlesbrough, and Keith Goldsbrough, Stockton-on-Tees, England, assignors to British Titan Limited, Billingham, Teesside, England
No Drawing. Filed Mar. 30, 1972, Ser. No. 239,705
Claims priority, application Great Britain, Apr. 7, 1971, 9,035/71; Dec. 7, 1971, 56,718/71
Int. Cl. C09c 1/36
U.S. Cl. 106—300    23 Claims

ABSTRACT OF THE DISCLOSURE

A process for the pelletisation of a pigment in which the pigments are passed in a finely-divided form through a sieve having a mesh number of not less than 5 and not greater than 44 according to British Standard specification No. 410 (1943) and then trundling the treated pigment in dry form until the desired pellets have been formed, preferably the pigment has a bulk density of at least 0.34 gram per millilitre prior to sieving.

---

This invention relates to the treatment of pigments particularly to titanium dioxide pigments to produce a pelletised product.

According to the present invention a process for the treatment of a pigment to produce a pelletised product comprises passing the pigment in finely divided form through a sieve having a mesh number of not less than 5 and not greater than 44 according to British Standard specification No. 410 (1943) and then trundling the so-treated pigment in dry form until the desired pellets have formed.

Preferably the pigment has a bulk density of at least 0.34 gram per millilitre prior to passage through the sieve.

Surprisingly, it has been found that by passing the pigment of appropriate bulk density through a sieve having a mesh size within that range specified hereinbefore improves the control and efficiency of pelletisation as compared to using a pigment having a bulk density less than the minimum figure set out.

The whole of the pigment is passed through the sieve and it is believed that this operation is effective in producing so-called nuclei for the subsequent pelletisation. When the pigment has a bulk density above the minimum, the production of nuclei is believed to be most efficient.

The process of the invention is suitable for use with all types of inorganic pigments such as ochre, zinc oxide or alumina but preferably is of use in the pelletisation of titanium dioxide pigments. Any type of titanium dioxide pigment can be used, uncoated or coated with hydrous oxides and/or organic compounds providing the pigment is not such as to be inherently incapable of pelletisation. Anatase or rutile titanium dioxide can be pelletised.

Preferably the titanium dioxide is one having a coating of one or more hydrous metal oxides in a total amount of at least 3.5 percent by weight of $TiO_2$. The use of such a pigment ensures that the maximum ease of pelletisation is obtained and that the pellets formed will be substantially free of grits when the pigment is dispersed in a liquid medium. Typical hydrous oxides that can be present are those of aluminium, titanium, cerium, zirconium or silicon. Such types of hydrous oxides are well known and of differing composition. Preferably the total amount of hydrous oxides is at least 5 percent by weight of $TiO_2$ and when the pellets formed are to be used in the manufacture of aqueous emulsion paints then at least 12 percent by weight of the hydrous oxide(s) should be present. Preferably both a hydrous oxide of aluminium and a hydrous oxide of silicon are present in the coating with the mole ratio of the hydrous silica to hydrous alumina being from 1:2 to 3:1. Preferably for use in aqueous emulsion paints, the coating contains hydrous silica in an amount of from 60 to 90 molar percent and hydrous alumina in an amount of from 40 to 10 molar percent based on the total weight in moles of the coating and in which the weight of hydrous oxide of silicon is from 9 to 15 percent of the weight of the $TiO_2$. The pigment may be coated with an organic compound such as an alkanolamine, polyol or polyamine, e.g., triethanolamine, pentaerythritol or trimethylol propane which can be applied in a fluid energy milling process. Pelletised pigments are described and claimed in our copending British application No. 9,036/71.

For most efficient pelletisation it has been found that the pigment should have a bulk density of at least 0.34 gram per millilitre when it is to be passed through the sieve. Pigments having bulk density less than 0.34 gram per millilitre have been found not to undergo pelletisation so readily and control of the process is more difficult. It is believed that a minimum bulk density is desirable to effect most readily adequate nuclei formation on passage through the sieve.

Often pigment is transported through pipes using air under pressure as the transport medium and the bulk density of the pigment will be reduced. Also pigment obtained directly from a fluid energy mill will have a low bulk density. When such pigment is to be used in the process of this invention then it is desirable to ensure that the bulk density is increased to at least the preferred minimum of 0.34 gram per millilitre. This increase in bulk density can be achieved in a variety of ways, for example by allowing the pigment to rest in a storage bunker with a vibratory collar until the required increase in bulk density has occurred.

Preferably the pigment has a bulk density of 0.4 to 0.5 gram per millilitre prior to passing the pigment through the sieve.

The sieves that are used in the present invention have a mesh number of at least 5 and not greater than 44. These mesh sizes are British Standard sizes as defined in British Standard specification No. 410 (1943) in which the sieve having a mesh number of 5 has apertures having a size of 3.36 mm. by 3.36 mm. and the sieve having a mesh number of 44 has apertures having a size of 0.35 mm. by 0.35 mm. Preferably the sieve has a mesh number of from 7 to 44. The sieve having a mesh number of 7 has apertures having a size of 2.41 mm. by 2.41 mm. Normally wire sieves are used. Generally, it has been found that it is preferable to employ sieves having the lowest mesh number to ensure the most uniformly sized pellets. Sieves having a mesh number of above 44 are extremely inconvenient to use in that they require the titanium dioxide to be forced through the sieve. Consequently the use of sieves having a number greater than 44 is not a practical proposition.

The chosen sieve preferably has a mesh number from 10 to 22. Such sieves have apertures having a size of 1.68 mm. by 1.68 mm. to 0.70 mm. by 0.70 mm. Preferably the sieve is shaken mechanically during the process of the invention in order that the passage of the pigment through the sieve is eased. If desired, pressure can be applied to the pigment but this is not preferred. The sieve can be mounted so as to be supplied with pigment to be sieved from a hopper and the sieved pigment can be passed directly to the trundler.

After passing the pigment through the sieve it is pelletised by trundling in the dry state. This is usually accomplished by placing the pigment in a cylindrical drum which is rotated by suitable means, for example by rollers forming a trundler. The tumbling action in the drum ensures pelletisation. Preferably the pelletisation is a continuous process with the pigment fed into one end of the drum and pellets recovered at the other end. The pigment can be fed into the drum by means of a vibratory feeder or by any other suitable means providing compaction of the pigment does not occur. Preferably, the exit end of the drum is conical in shape so that it is in the form of a truncated cone in which the angle between the cone surface and a projection of the cylindrical wall of the drum is not greater than the angle of slip of the pellets on the material forming the drum. For instance, for a drum formed of stainless steel the angle is not greater than 12° when pellets are formed from $TiO_2$ having a coating of 10 percent silica and 5 percent $Al_2O_3$. Suitable apparatus for effecting pelletisation is described and claimed in our copending British application No. 9,034/71.

Preferably, the pigment to be pelletised is introduced at a point located at least one sixth along the length of the drum or at least 3 feet whichever is the smaller. This position of introduction ensures that the feed falls onto a pre-formed bed of pellets and prevents build-up of the fresh pigment on the cylindrical walls and on the back wall of the vessel.

Usually, the pigment is trundled for a period of time of up to 1 hour prior to discharging as pellets but naturally the shortest possible time consistent with good quality is preferred for economic and efficient operation of the process.

The pellets of titanium dioxide produced in accordance with the present invention will have a size usually within the range of 5 mesh to 72 mesh. The amount of the pigment pelletised during a fixed period of pelletisation in the drum is increased when the pigment is treated in accordance with the process of the present invention.

The pellets of titanium dioxide produced in accordance with this invention can be used in a wide variety of applications and can be redispersed in a paint or other media into the constituent pigment using conventional milling and other dispersion apparatus to give a product substantially the same as that obtained from the unpelletised pigment and in particular with the result that the dispersion is substantially free of grits.

The invention is illustrated in the following examples:

EXAMPLE 1

Samples of the rutile titanium dioxide pigment coated with a hydrous oxide of aluminium in an amount equivalent to 5 percent $Al_2O_3$ and with a hydrous oxide of silicon equivalent to 10 percent $SiO_2$ on $TiO_2$ were passed through various sized sieves as set out below:

| Sample number | Sieve mesh number | Aperture size, mm. |
|---|---|---|
| 1 | Nonsieved | |
| 2 | 7 | 2.41 x 2.41 |
| 3 | 10 | 1.68 x 1.68 |
| 4 | 16 | 1.00 x 1.00 |
| 5 | 22 | 0.70 x 0.70 |
| 6 | 44 | 0.35 x 0.35 |

The samples were then each pelletised by placing in a 720 ml. glass jar 300 grams of the pigment and rotated on rollers at 110 r.p.m. for 1 hour.

The pelletised dust free products were sized using British Standard sieves and the results are set out below.

| | Mesh No. | Product size range (percent w./w.) mesh No. | | | | | |
|---|---|---|---|---|---|---|---|
| | | >7 | <7 >10 | <10 >16 | <16 >22 | <22 >44 | <44 >72 | <72 |
| Sample: | | | | | | | | |
| 1 | Nonsieved | 5.8 | 1.0 | 2.2 | 6.0 | 46.2 | 38.8 | 0.1 |
| 2 | 7 | 2.9 | 0.7 | 1.6 | 6.9 | 57.6 | 30.3 | 0.1 |
| 3 | 10 | 0.1 | 0.2 | 8.7 | 13.0 | 50.0 | 28.0 | 0.1 |
| 4 | 16 | 0 | 0 | 13.0 | 20.0 | 39.0 | 28.0 | 0.1 |
| 5 | 22 | 0 | 0 | 0 | 2.6 | 67.5 | 29.9 | 0.1 |
| 6 | 44 | 0.2 | 0.3 | 1.0 | 0.5 | 75.0 | 23.0 | 0.1 |

The pigment passed through sieve of mesh number 10, 16 and 22 before pelletisation gave products which pelletised more quickly and more evenly. The use of the higher mesh numbers produced a more "tighter" size range but in commercial production it is advisable to use the smaller mesh numbers.

All the pelletised products could be redispersed to give grit-free emulsion paints.

EXAMPLE 2

Samples of rutile titanium dioxide pigment which had been prepared by the vapour phase oxidation of titanium tetrachloride were taken from the discharge from a fluid energy mill. The pigment had previously been coated with a hydrous oxide of aluminium in an amount equivalent to 5% $Al_2O_3$ and with a hydrous oxide of silicon equivalent to 10% of $SiO_2$ on $TiO_2$. Samples of the pigment having different bulk densities were passed through a sieve having a mesh number of 10. The pigments were examined visually for any sign of nucleation.

| Pigment temp., °C. | Bulk density | | Nucleation |
|---|---|---|---|
| | Unsieved | After sieving | |
| 75 | 0.326 | 0.318 | Very slight. |
| 85 | 0.312 | 0.300 | Do. |
| 72 | 0.320 | 0.31 | Slight. |
| 46 | 0.306 | 0.303 | Do. |
| 46 | 0.34 | | Good. |
| Room temp. | 0.34 | 0.327 | Do. |

The sieved pigments were each treated in a trundler for 1 hour to determine the ease of pelletisation. Only the samples having a bulk density prior to sieving of 0.34 grams per millilitre pelletised satisfactorily. Pelletisation of the pigments having a low bulk density required a longer time in the trundler and the process was more difficult to control.

What is claimed is:

1. A process for the treatment of a pigment to produce a pelletised product which comprises passing the pigment in finely-divided form through a sieve having a mesh number of not less than 5 and not greater than 44 according to British Standard specification No. 410 (1943) and then trundling the so-treated pigment in dry form until the desired pellets have formed.

2. A process according to claim 1 in which the sieve has a mesh number of from 7 to 44.

3. A process according to claim 1 in which the sieve is a wire sieve.

4. A process according to claim 2 in which the sieve has a mesh number of from 10 to 22.

5. A process according to claim 1 in which the sieve is shaken mechanically whilst the pigment is passed through it.

6. A process according to claim 1 in which the sieve is mounted so as to be supplied with pigment to be sieved from a hopper.

7. A process according to claim 1 in which pressure is applied to the pigment during sieving.

8. A process according to claim 1 in which the pigment has a bulk density of at least 0.34 gram per millilitre prior to passage through the sieve.

9. A process according to claim 8 in which the pigment has a bulk density of 0.4 to 0.5 gram per millilitre prior to passing through the sieve.

10. A process according to claim 1 in which the pigment to be sieved is obtained directly from a fluid energy mill and has a bulk density less than 0.34 gram per millilitre.

11. A process according to claim 10 in which the bulk density of the pigment is increased prior to sieving to at least 0.34 gram per millilitre by allowing the pigment to rest in a storage bunker fitted with a vibratory collar until the required increase in bulk density has occurred.

12. A process according to claim 1 in which the pigment is pelletised in a cylindrical drum which is rotated by suitable means.

13. A process according to claim 12 in which the pigment is fed into the drum by means of a vibratory feeder.

14. A process according to claim 1 in which the pelletisation is a continuous process.

15. A process according to claim 12, in which the pigment to be pelletised is introduced into the drum at a point located at least one-sixth along the length of the drum or at least 3 feet along the drum whichever is the smaller.

16. A process according to claim 1 in which the pigment is trundled for a period of time of up to 1 hour prior to discharge as pellets.

17. A process according to claim 1 in which the pigment to be pelletised is titanium dioxide.

18. A process according to claim 17 in which the titanium dioxide to be sieved has a coating of one or more hydrous oxides in a total amount of at least 3.5% by weight of $TiO_2$.

19. A process according to claim 18 in which the hydrous oxide is an oxide of aluminium, titanium, cerium, zirconium or silicon.

20. A process according to claim 18 in which the total amount of hydrous oxide is at least 5% by weight of $TiO_2$.

21. A process according to claim 18 in which the hydrous oxide is present in at least 12% by weight of $TiO_2$.

22. A process according to claim 18 in which a hydrous oxide of aluminium and a hydrous oxide of silicon are present in the coating with the mole ratio of the hydrous silica to hydrous alumina being from 1:2 to 3:1.

23. A process according to claim 18 in which the coating contains hydrous silica in an amount of from 60 to 90 molar percent and hydrous alumina in an amount of from 40 to 10 molar percent based on the total weight in moles of the coating and in which the weight of hydrous oxide of silicon is from 9 to 15% of the weight of the $TiO_2$.

References Cited
UNITED STATES PATENTS

| | | | |
|---|---|---|---|
| 3,437,502 | 4/1969 | Werner | 106—308 B |
| 3,545,994 | 12/1970 | Lott et al. | 106—308 B |
| 3,554,777 | 1/1971 | Lederer et al. | 106—308 B |
| 3,649,322 | 3/1972 | Foss | 106—300 |

CURTIS R. DAVIS, Primary Examiner

U.S. Cl. X.R.

106—308 B, 309